United States Patent
Kumar et al.

(10) Patent No.: US 12,377,989 B2
(45) Date of Patent: Aug. 5, 2025

(54) ENVIRONMENTAL CONTROL SYSTEM

(71) Applicant: Honeywell International Inc., Charlotte, NC (US)

(72) Inventors: Deepak Kumar, Bangalore (IN); Prashant Deshpande, Bangalore (IN); Muralidhar Manavalan, Bangalore (IN); Prakash V S, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/318,137

(22) Filed: May 16, 2023

(65) Prior Publication Data

US 2024/0286746 A1    Aug. 29, 2024

(30) Foreign Application Priority Data

Feb. 24, 2023 (IN) .............................. 202311012637

(51) Int. Cl.
*B64D 13/08* (2006.01)
*B64D 13/06* (2006.01)
*B64D 27/02* (2006.01)

(52) U.S. Cl.
CPC ...... *B64D 13/08* (2013.01); *B64D 2013/0618* (2013.01); *B64D 27/026* (2024.01)

(58) Field of Classification Search
CPC ..... F02C 6/08; F02C 7/12; F02C 7/16; B64D 13/08; B64D 27/026; B64D 2013/0618
See application file for complete search history.

(56) References Cited

U.S. PATENT DOCUMENTS

| | | | |
|---|---|---|---|
| 4,419,926 A | 12/1983 | Cronin et al. | |
| 6,058,715 A | 5/2000 | Strang et al. | |
| 6,427,471 B1 | 8/2002 | Ando et al. | |
| 7,970,497 B2 | 6/2011 | Derouineau et al. | |
| 8,915,095 B2 | 12/2014 | Bruno et al. | |

(Continued)

FOREIGN PATENT DOCUMENTS

| | | |
|---|---|---|
| EP | 1386837 B1 | 11/2006 |
| JP | 2000203497 A | 7/2000 |

(Continued)

OTHER PUBLICATIONS

Extended Search Report from counterpart European Application No. 24155573.9 dated Jun. 27, 2024, 9 pp.

(Continued)

*Primary Examiner* — Andrew H Nguyen
(74) *Attorney, Agent, or Firm* — Shumaker & Sieffert, P.A.

(57) ABSTRACT

An example system includes a turbine comprising an input port and mechanically coupled to a motor-generator and a compressor and control circuitry configured to determine whether a pressure of a fluid at the input port of the turbine is less than or equal to than a threshold pressure. In response to determining that the pressure of the fluid at the input port of the turbine is less than or equal to the threshold pressure, the control circuitry is configured to cause the motor-generator to operate in motor mode. The motor-generator is configured to be mechanically coupled to the compressor, and the motor-generator is configured to provide mechanical energy to drive the compressor when operating in motor mode.

18 Claims, 3 Drawing Sheets

(56) References Cited

U.S. PATENT DOCUMENTS

| | | | |
|---|---|---|---|
| 9,656,755 | B2 | 5/2017 | Durbin et al. |
| 10,358,221 | B2 | 7/2019 | Sautron |
| 10,731,501 | B2 | 8/2020 | Bruno et al. |
| 11,014,677 | B2 | 5/2021 | Defrancesco et al. |
| 2006/0231680 | A1 | 10/2006 | Derouineau et al. |
| 2015/0251766 | A1* | 9/2015 | Atkey .................. B64D 13/08 60/785 |
| 2018/0009536 | A1* | 1/2018 | Christopherson ..... F01D 17/145 |
| 2020/0158017 | A1 | 5/2020 | Vassallo et al. |
| 2020/0346763 | A1 | 11/2020 | DeFrancesco et al. |
| 2021/0246837 | A1 | 8/2021 | Romero et al. |

FOREIGN PATENT DOCUMENTS

| | | | |
|---|---|---|---|
| JP | 2006231974 | A | 9/2006 |
| JP | 4136809 | B2 | 8/2008 |
| KR | 102124120 | B1 | 6/2020 |
| WO | 2017149228 | A1 | 9/2017 |

OTHER PUBLICATIONS

Response to Extended Search Report dated Jun. 27, 2024, from counterpart European Application No. 24155573.9 filed Aug. 22, 2024, 38 pp.

Notice of Intent to Grant and Text Intended to Grant from counterpart European Application No. 24155573.9 dated Jun. 2, 2025, 54 pp.

* cited by examiner

ENVIRONMENTAL CONTROL SYSTEM

This application claims priority to Indian Provisional Patent Application No. 202311012637, entitled "ENVIRONMENTAL CONTROL SYSTEM" and filed on Feb. 24, 2023, the entire content of which is incorporated herein by reference.

TECHNICAL FIELD

The present disclosure relates to systems and techniques for producing conditioned air for a vehicle cabin.

BACKGROUND

An environmental control system (ECS) provides air supply, thermal control, and cabin pressurization to a cabin of a vehicle. In aircraft, an ECS utilizes air cycle refrigeration via an air cycle machine (ACM), which uses bleed air from an engine. During certain flight phases, or operational states of the vehicle, the use of bleed air is a source of drag for the engine causing increased fuel consumption.

SUMMARY

In one example, this disclosure describes a system including: a turbine comprising an input port and mechanically coupled to a motor-generator and a compressor; and control circuitry configured to: determine whether a pressure of a fluid at the input port of the turbine is less than or equal to than a threshold pressure; and in response to determining that the pressure of the fluid at the input port of the turbine is less than or equal to the threshold pressure, cause the motor-generator to operate in motor mode, wherein the motor-generator is configured to be mechanically coupled to the compressor, wherein the motor-generator is configured to provide mechanical energy to drive the compressor when operating in motor mode.

In another example, this disclosure describes a method including: determining, by control circuitry, whether a pressure of a fluid at an input port of a turbine is less than or equal to a threshold pressure; and in response to determining that the pressure at the input port of the turbine is less than or equal to the threshold pressure, causing, by the control circuitry, a motor-generator mechanically coupled to the turbine to operate in a motor mode, wherein the motor-generator and the turbine are mechanically coupled to a compressor, wherein the motor-generator provides mechanical energy to drive the compressor when operating in motor mode.

In another example, this disclosure describes a non-transitory computer readable medium comprising instructions that when executed cause one or more processors to: determine whether a pressure of a fluid at an input port of a turbine is less than or equal to than a threshold pressure; and in response to determining that the pressure at the input port of the turbine is less than or equal to the threshold pressure, cause a motor-generator mechanically coupled to the turbine to operate in motor mode, wherein the motor-generator and the turbine are mechanically coupled to a compressor, wherein the motor-generator provides mechanical energy to drive the compressor when operating in motor mode.

The details of one or more examples are set forth in the accompanying drawings and the description below. Other features, objects, and advantages will be apparent from the description and drawings, and from the claims.

BRIEF DESCRIPTION OF THE FIGURES

Like reference characters refer to like elements throughout the figures and description.

DETAILED DESCRIPTION

This disclosure describes systems and techniques for controlling an environmental control system (ECS) of a vehicle to provide air, thermal control, and cabin pressurization to a cabin of a vehicle. A conventional ECS works based on air cycle refrigeration by using an air cycle machine (ACM) which is powered solely by bleed air from an engine. A vehicle may include other bleed air consumers in addition to the ECS. In aircraft, an anti-icing system and a nitrogen generation system may also utilize bleed air. When multiple bleed air consumers of the vehicle are operating concurrently, there may not be enough bleed air pressure and/or bleed air flow to satisfy the bleed air demand from a low pressure bleed port of the engine, and the high pressure bleed port may be used. The low pressure bleed port is located at a different compression stage within the engine than the high pressure bleed port, namely, a lower compression stage. The higher pressure air from the high pressure bleed port provides more pneumatic energy to the bleed air consumers of the vehicle, but the engine has done more work to pressurize that higher pneumatic energy that would otherwise be mixed with fuel and combusted to produce thrust. Consequently, providing bleed air from the high pressure bleed port may be a cause of drag on the engine that may be larger than a drag caused by providing bleed air from the low pressure bleed port of the engine. The increased drag causes increased fuel consumption and increased emissions from the engine.

In accordance with the systems and techniques described herein, an ECS system of a vehicle includes a turbine mechanically coupled to a motor-generator and a compressor. The ECS system may comprise an ACM comprising the turbine, compressor, motor-generator, and a controller configured to cause one or more bleed ports and/or bleed port valves fluidically coupled to the ACM to provide bleed air to the ACM to open and/or close to select between bleed air from a high pressure bleed port or a low pressure bleed port. The controller may be further configured to cause and/or control the motor-generator to operate in a motor mode to assist the turbine in driving the compressor, e.g., when the bleed air pressure at an input port of the turbine is lower than a threshold pressure, or to operate in a generator mode, e.g., when the bleed air pressure at the input port of the turbine is equal to or greater than the threshold pressure. For example, if the pressure of the bleed air at the input port of the turbine is greater than or equal to the threshold pressure, the control circuitry is configured to cause the motor-generator to operate in generator mode. When operating in generator mode, the motor-generator may convert mechanical energy to electrical energy and may be electrically coupled to an energy storage device configured to store electrical energy, e.g., converted by the motor-generator. In some examples, the controller is configured to boost driving of the compressor via the motor-generator while utilizing bleed air only from the low pressure bleed port of an engine during bleed air demands of the vehicle and/or flight phases of the vehicle that would otherwise require utilizing the relatively higher pressure of bleed air from the high pressure bleed port, e.g., to improve the efficiency of the engine during flight phases that demand high thrust. In some examples, systems for smart engine bleed selection using hybrid air cycle machines and controllers are disclosed.

Figure 1:
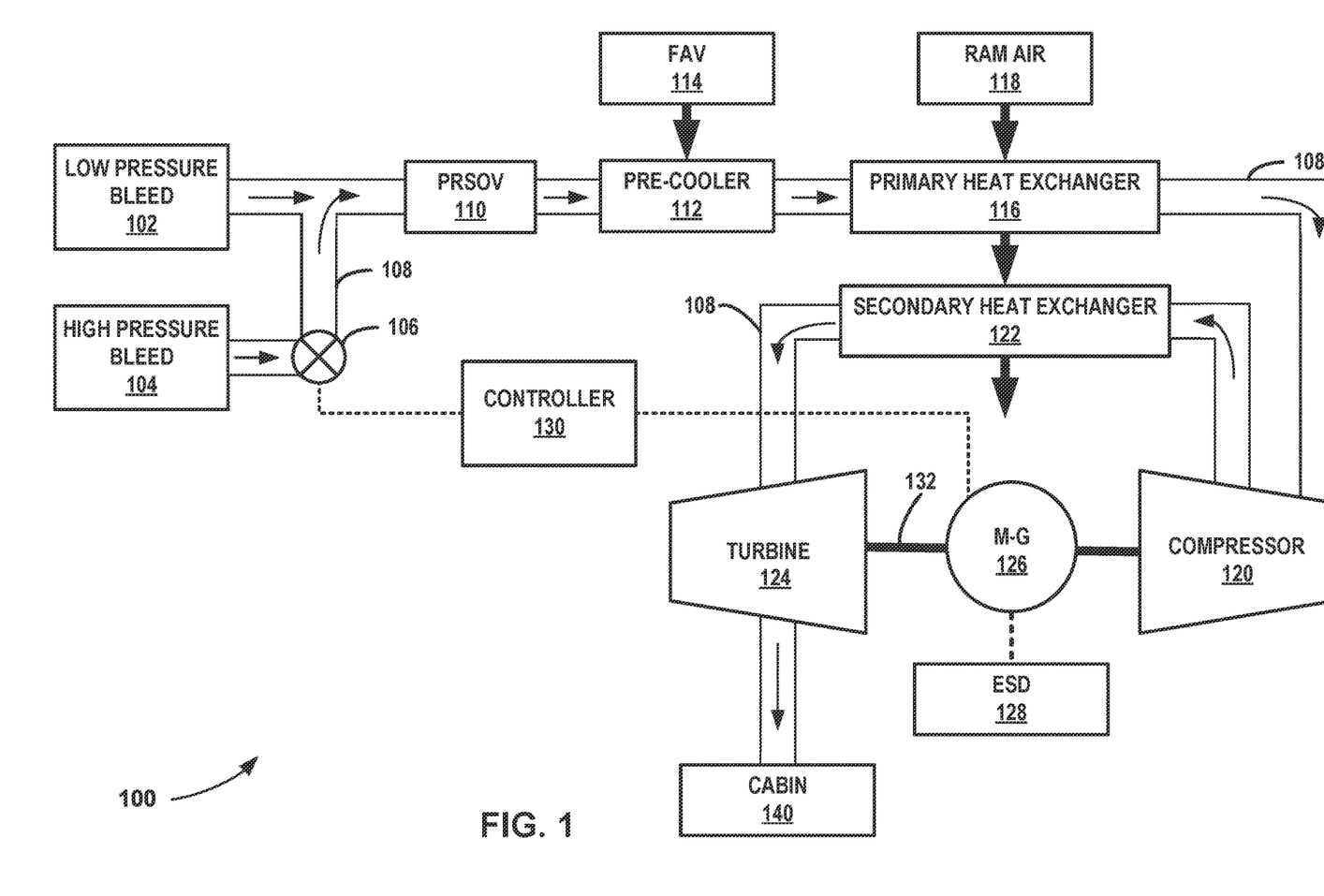
FIG. 1 is a schematic diagram of an example environmental control system, in accordance with the techniques of this disclosure.

FIG. 1 is a schematic diagram of an example ACM 100 of an environmental control system, in accordance with the techniques of this disclosure. ACM 100 may be configured to utilize bleed air from an engine compressor of an engine (not shown) that may produce a high pressure engine air. The engine compressor may have multiple compression stages, and ACM 100 may be configured to receive the high pressure air at different pressures via different bleed ports corresponding to the different compression stages. For example, the engine may be a gas turbine system having two bleed extraction ports, e.g., low pressure bleed port 102 and high pressure bleed port 104. ACM 100 may be configured to receive the high pressure air from low pressure bleed port 102 and high pressure bleed port 104, where high pressure bleed air from the high pressure bleed port 104 may comprise bleed air at a higher pressure and/or temperature relative to the high pressure bleed air from the low pressure bleed port 102. The low and high pressure bleed ports 102, 104 may be configured to provide high pressure bleed air from compression stages before fuel is mixed with the air in the engine. In some examples, low and high pressure bleed ports 102, 104 may be considered to be a part of ACM 100. In some examples, the engine may be a main engine and/or an auxiliary power unit (APU). In some examples, ACM 100 may include a plurality of each of low and high pressure bleed ports 102, 104, e.g., corresponding to a plurality of vehicle engines.

In the example shown, ACM 100 includes bleed port valve 106, which may be a High Stage Valve (HSV). Bleed port valve 106 may be configured to regulate how much bleed air is provided to ACM 100 downstream from bleed port valve 106, and/or how much of the bleed air that is provided to ACM 100 is from high pressure bleed port 104 relative to how pressure bleed port 102. In the example shown, opening bleed port valve 106 may allow the flow of bleed air from high pressure bleed port 104 to flow downstream to the rest of ACM 100 and may cause the flow of bleed air from low pressure bleed port 102 to reduce and/or stop, e.g., by virtue of the relatively higher pressure bleed air from high pressure bleed port 104 taking up the flow volume of tubing 108 and not allowing the relatively lower pressure air from low pressure bleed port 102 to flow to the now higher pressure downstream from bleed port valve 106. In some examples, ACM 100 may include a plurality of bleed port valves 106, e.g., a bleed port valve 106 fluidically coupled between high pressure bleed port 104 and the downstream portions of ACM 100, and another bleed port valve (not shown) fluidically coupled between low pressure bleed port 102 and the downstream portions of ACM 100. For example, ACM 100 may include multiple bleed port valves 106, and/or other flow components (e.g., backflow preventers), to prevent air from flowing out of low and/or high pressure bleed ports 102, 104 and to the engine.

In the example shown, ACM 100 includes pressure relief shut off valve 110 downstream from low and high pressure bleed ports 102, 104 and bleed port valve 106, and ACM 100 includes pre-cooler 112 downstream from pressure relief shut off valve 110. Pressure relieve shut off valve 110 may be configured to regulate and/or reduce pressure within ACM 100, and may be configured to stop a flow of air within ACM 100 (e.g., reduce a pressure drop from an inlet of ACM 100 to an outlet of ACM 100 to a zero pressure drop). Pre-cooler 112 may be configured to reduce a temperature of the bleed air. In some examples, pre-cooler 112 may be a heat exchanger utilizing fan air (e.g., ambient air external to the vehicle) via fan air valve 114 as the cooling fluid to exchange heat from the bleed air to the fan air.

In the example shown, ACM 100 includes primary heat exchanger 116 downstream from pre-cooler 112. Primary heat exchanger 116 may be configured to reduce a temperature of the bleed air, e.g., utilizing ram air 118 as the cooling fluid to exchange heat from the bleed air to the ram air. In the example shown, ACM 100 includes compressor 120, which may be a turbocharger or supercharger, downstream from primary heat exchanger 116, and a secondary heat exchanger 122 downstream from compressor 120. Compressor 120 may be configured to compress the bleed air, which may increase a temperature of the bleed air. Secondary heat exchanger 116 may be configured to reduce a temperature of the bleed air, e.g., utilizing ram air 118 as the cooling fluid to exchange heat from the bleed air to the ram air. In the example shown, the ram air 118 utilized by secondary heat exchanger 122 may be ram air that is downstream of the ram air utilized by primary heat exchanger 116. For example, although the ram air utilized by secondary heat exchanger 122 may have a temperature that is relatively higher than the upstream ram air utilized by primary heat exchanger 116, the temperature of the bleed air is also increased via compression and the relatively hotter, downstream ram air is useable to remove heat from the bleed air via secondary heat exchanger 122.

In the example shown, ACM 100 includes turbine 124 downstream from secondary heat exchanger 122, and upstream of a volume to be pressurized and/or cooled, which may be a cabin environment 140. Turbine 124 may be configured to be driven by the bleed air pressure. For example, turbine 124 may be configured to be driven by the pressure of the bleed air at the input port via a drop in pressure of the bleed air over turbine 124 (e.g., over fan blades of turbine 124) between the input port and an output port of turbine 124. The bleed air may enter turbine 124 via an input port of turbine 124, expand over blades of the turbine to drive the blades, e.g., transferring energy to turbine 124 via exerting work on the turbine blades, which convert the energy to mechanical energy. The bleed air, via the expansion, cools and exits turbine 124 via an exit port and is provided to cabin 140.

In the example shown, turbine 124 may be configured to be mechanically coupled to motor-generator 126 and compressor 120, e.g., via shaft 132. In some examples, shaft 132 may be a common shaft between each of turbine 124, motor-generator 126, and compressor 120. In some examples, ACM 100 may be a two-wheel system comprising compressor 120 and turbine 124 on a single integral shaft, e.g., shaft 132, which may be also mechanically coupled with motor-generator 126. In other examples, ACM 100 may be a three-wheel system comprising compressor 120, turbine 124, and a fan (not shown) on a single integral shaft, e.g., shaft 132, which may be also mechanically coupled with motor-generator 126.

In the example shown, turbine 124 and compressor 120 are fluidically coupled. For example, an output port of compressor 120 is fluidically coupled to in input port of turbine 124, via secondary heat exchanger 122. Also in the example shown, turbine 124 is fluidically coupled to low and pressure bleed port 102, e.g., via tubing 108 and components of ACM 100, and turbine 124 is fluidically coupled to high pressure bleed port 104 via bleed port valve 106, e.g., via tubing 108 and components of ACM 100.

Motor-generator 126 may be configured to be electrically coupled to energy storage device 128, which may be a battery. Motor-generator 126 may be configured to provide energy to energy storage device 128. For example, turbine 124 may be configured to drive motor-generator 126 operating in a generator mode, and motor-generator 126 may be configured to convert mechanical energy from turbine 124 to electrical energy and to provide the electrical energy to energy storage device 128. Motor-generator 126 may be configured to provide mechanical energy to compressor 120. For example, motor-generator 126 may be configured to receive electrical energy from energy storage device 128 and to convert the electrical energy to mechanical energy to drive compressor 120, e.g., via shaft 132. In some examples, motor-generator 126 may be configured to drive compressor 120 along with turbine 124, e.g., motor-generator may be configured to boost the mechanical energy provided to compressor 120 via shaft 132

In some examples, motor-generator 126 may be configured to operate to regulate the compression of the bleed air by compressor 120. For example, if turbine 124 provides an excess of mechanical energy to drive compressor 120 for a desired compression ratio, motor-generator 126 may be configured to operate in generator mode to convert a portion of the mechanical energy to electrical resistance, thereby providing resistance to the driving energy from turbine 124 in an appropriate amount to achieve the desired compression by compressor 120. If turbine 124 does not provide enough mechanical energy to drive compressor 120 for a desired compression ratio, motor-generator 126 may be configured to operate in motor mode to convert a portion of electrical energy to mechanical energy, thereby providing a boost to the driving energy from turbine 124 in an appropriate amount to achieve the desired compression by compressor 120.

In the example shown, ACM 100 includes controller 130. Controller 130 may be configured to control the operation of one or more components of ACM 100. For example, controller 130 may be configured to control and/or cause low and high pressure bleed ports 102, 104 to open and/or close, bleed port valve 106 to open and/or close, fan air valve 114 to open and/or close, to regulate ran air 118 (e.g., via a valve), and to cause and/or control motor-generator 126 to operate in generator mode or motor mode. Controller 130 may be configured to determine one or more parameters of ACM 100. For example, controller 130 may be configured to determine a pressure of bleed air at one or more positions in ACM 100 such as at low and high pressure bleed ports 102, 104, upstream or downstream from bleed port valve 106, pressure relief shut off valve 110, primary heat exchanger 116, compressor 120, secondary heat exchanger 122, and/or turbine 124, e.g., via one or more sensors (not shown).

Controller 130 may comprise control circuitry, processing circuitry, non-transitory computer-readable storage medium (e.g., memory), and the like. Controller 130, as well as other processors, processing circuitry, controllers, control circuitry, and the like, described herein, may include any combination of integrated circuitry, discrete logic circuitry, analog circuitry, such as one or more microprocessors, digital signal processors (DSPs), application specific integrated circuits (ASICs), or field-programmable gate arrays (FPGAs). In some examples, control circuitry 42 may include multiple components, such as any combination of one or more microprocessors, one or more DSPs, one or more ASICs, or one or more FPGAs, as well as other discrete or integrated logic circuitry, and/or analog circuitry. In some examples, control circuitry 42 is or includes a "smart" device or system, including, but not limited to, a robotic device, a device configured to operate with the aid of artificial intelligence (AI), a virtual reality (VR) systema, cloud-based interfaces for data processing and/or data storage, or any combination thereof.

Non-transitory computer-readable storage medium (e.g., memory), may store program instructions, such as software, which may include one or more program modules, which are executable by controller 130. When executed by controller 130, such program instructions may cause controller 130 to provide the functionality ascribed to controller 130 herein. The program instructions may be embodied in software and/or firmware. Non-transitory computer-readable storage medium may include any volatile, non-volatile, magnetic, optical, or electrical media, such as a random access memory (RAM), read-only memory (ROM), non-volatile RAM (NVRAM), electrically-erasable programmable ROM (EEPROM), flash memory, ferroelectric RAM (FRAM), or any other digital media.

In some examples, ACM 100 is configured to provide cooled air to a cabin of a vehicle, such as an aircraft. ACM 100 may be configured to efficiently use bleed air to efficiently provide air, thermal control, and cabin pressurization to a cabin of a vehicle, such as an aircraft, while improving the efficiency of the vehicle engine. In some examples, ACM 100 may be configured to efficiently provide air, thermal control, and cabin pressurization based on the demand for bleed air by other vehicle systems (e.g., anti-icing systems, nitrogen generation systems, or the like in an aircraft) and based on an operational state of the vehicle, e.g., whether the vehicle demands more or less thrust from the engine or engines providing the bleed air.

ACM 100 may be configured to improve the efficiency of an engine, particularly during certain flight phases when the engine and/or vehicle is in certain operational states. For example, ACM 100 may be configured to reduce the use of pressure bleed air from high pressure bleed port 104 by using bleed air from low pressure bleed port 102 that otherwise would not have enough energy and/or pressure (e.g., due to bleed air demands from other bleed air consumers of the vehicle) and boosting the driving force and/or energy of the bleed air driving turbine 124 from low pressure bleed port 102 via motor-generator 126 to drive compressor 120, e.g., to drive compressor 120 to achieve a desired compression and/or compression ratio.

For example, in an aircraft, when other systems (anti-icing systems, nitrogen generation systems) demand bleed air, controller 130 may determine that the bleed air pressure provided by bleed air from low pressure bleed port 102 is not sufficient for ACM 100 to deliver sufficient air, thermal control, and cabin pressurization to cabin 140, e.g., the pressure of bleed air at the input port of turbine 124 may be less than a threshold pressure. In some examples, controller 130 may be configured to determine whether the bleed air provided by low pressure bleed port 102 is greater than the demand for bleed air by the vehicle, e.g., whether the bleed air pressure at (or from) low pressure bleed port 102 is greater than the demand for bleed air pressure by systems of the vehicle, including ACM 100. In some examples, controller 130 may determine a bleed air demand based on determining whether systems other than ACM 100 are "on"

and demanding bleed air, such as anti-icing systems, nitrogen generation systems, or whether such other systems are "off" and not demanding bleed air. Controller 130 may then determine whether to provide more driving energy (e.g., or power, or force) to compressor 120 via turbine 124 by opening bleed port valve 106 valve to provide higher pressure bleed air from high pressure bleed port 104 to the input port of turbine 124, or to allow close bleed port valve 106 to remain closed (or to close bleed port valve 106) to provide relatively lower pressure bleed air to the input port of turbine 124 and cause and/or control motor-generator 126 to operate in motor mode, e.g., to boost and/or assist in driving, or providing mechanical energy to, compressor 120. Controller 130 may determine whether to provide more driving energy to compressor 120 based on an operational state of the vehicle, e.g., for an aircraft, based on a flight phase of the aircraft.

For example, if the operational state of the vehicle demands an increased, or a relatively high, amount of thrust by the engine, using bleed air from the high pressure bleed port 104 by ACM 100 may reduce the efficiency of the engine, as opposed to ACM 100 using bleed air from the low pressure bleed port 102. If the operational state of the vehicle does not demand an increased, or a relatively high, amount of thrust by the engine, using bleed air from the high pressure bleed port 104 by ACM 100 may not reduce the efficiency of the engine, or may reduce the efficiency of the engine to a lesser degree than using bleed air from the high pressure bleed port 104 during high thrust demand operational states.

In some examples, controller 130 may determine the vehicle operational state to be a first operational state in which the vehicle does not demand an increased, or a relatively high, amount of thrust by the engine, e.g., a "low" thrust demand operational state. For example, the first (or "low thrust demand") operational state may be a flight phase such as landing or descending, or the like. Controller 130 may be configured to cause and/or control bleed port valve 106 to close and/or remain closed to provide bleed air to the input port of turbine 124 (e.g., via pressure relief shut off valve 110, pre-cooler 112, primary heat exchanger 116, compressor 120, and secondary heat exchanger 122) from low pressure bleed port 102. In response to determining that the operational state of the vehicle is the first (low thrust demand) operational state, controller 130 may be configured to cause and/or control motor-generator 126 to operate in motor mode to provide mechanical energy to drive compressor 120.

In some examples, controller 130 may determine the vehicle operational state to be a second operational state in which the vehicle does demand an increased, or a relatively high, amount of thrust by the engine, e.g., a "high" thrust demand operational state. For example, the second (or "high thrust demand") operational state may be a flight phase such as taking off, climbing or cruising, or the like. Controller 130 may be configured to cause and/or control bleed port valve 106 to open to provide bleed air to the input port of turbine 124 (e.g., via pressure relief shut off valve 110, pre-cooler 112, primary heat exchanger 116, compressor 120, and secondary heat exchanger 122) from high pressure bleed port 104. In response to determining that the operational state of the vehicle is the second (high thrust demand) operational state, controller 130 may be configured to cause and/or control motor-generator 126 to operate in generator mode to provide electrical energy to electrical energy storage device 128. The energy stored may then be used by motor-generator 126 to operate in motor mode at other times.

In some examples when other vehicle systems (e.g., anti-icing systems, nitrogen generation systems for an aircraft) do not demand bleed air, controller 130 may be configured to determine whether a pressure of bleed air at the input port of turbine 124 is less than or equal to than a threshold pressure, and in response to determining that the pressure of the bleed air at the input port of turbine 124 is less than or equal to the threshold pressure, controller 130 may be configured to cause and/or control motor-generator 126 to operate in motor mode to provide mechanical energy to drive compressor 120. In response to determining that the pressure at the input port of the turbine is greater than the threshold pressure, controller 130 may be configured to cause and/or control motor-generator 126 to operate in generator mode to provide electrical energy to the electrical energy storage device. For example, when other vehicle systems are not demanding bleed air, or are demanding a relatively smaller amount of bleed air, controller 130 may be configured to cause and/or control motor-generator 126 to operate in motor mode or generator mode based on whether the bleed air pressure at the input port of turbine 124 is less than or equal to a threshold pressure, e.g., regardless of vehicle operational state and using bleed air for just the low pressure bleed port 102.

In some examples, ACM 100 may be configured to reduce the overall size and weight of a vehicle ACM system. For example, utilizing a motor-generator and electrical energy storage device may enable reduction in the size of other ACM 100 components, e.g., the turbine, compressor, one or more heat exchangers, and even the size/diameter of tubing fluidically coupling the components of ACM 100.

Figure 2:
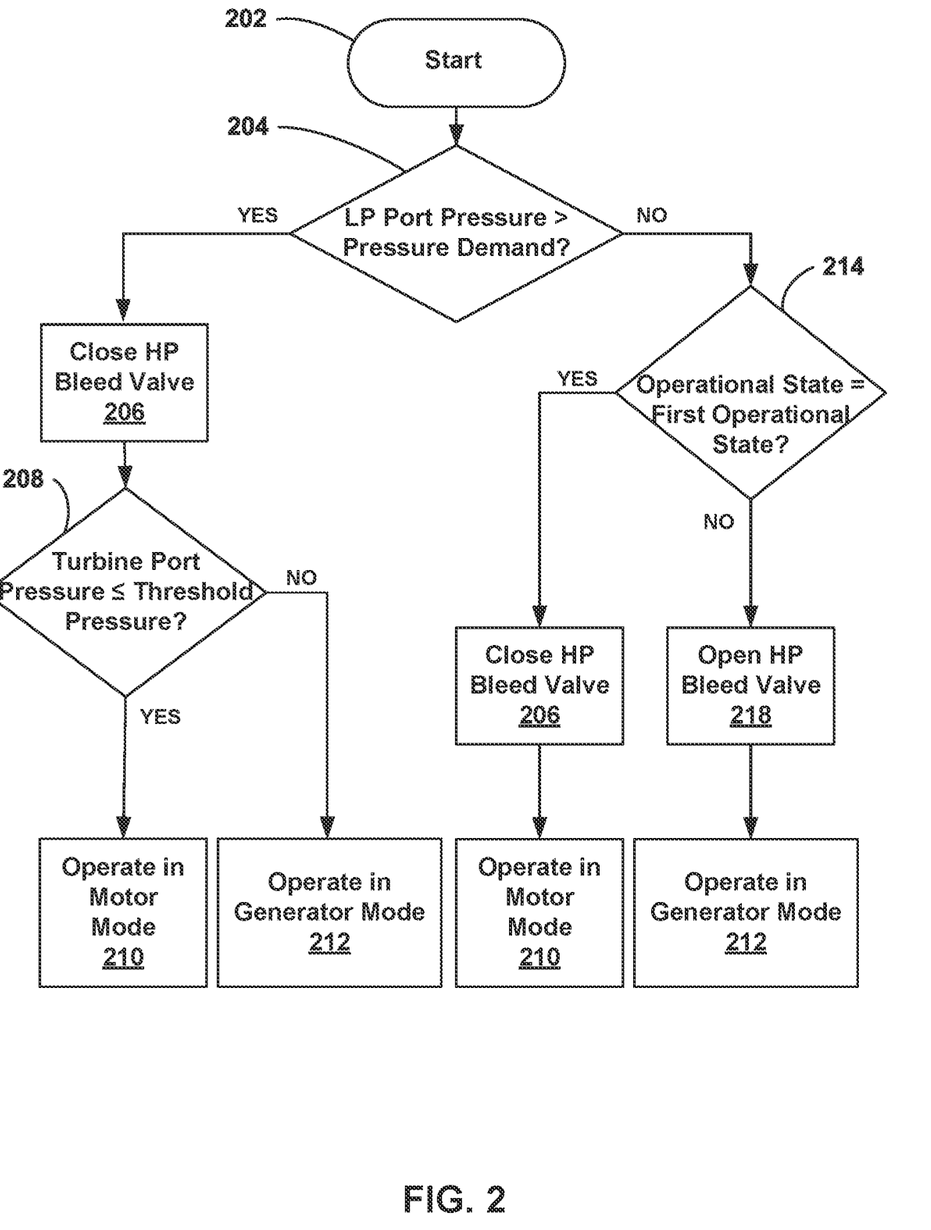
FIG. 2 is a flow diagram of an example method of controlling an environmental control system, in accordance with one or more techniques of this disclosure.

FIG. 2 is a flow diagram of an example method of controlling an environmental control system, in accordance with one or more techniques of this disclosure. While FIG. 2 is described with reference to ACM 100 and controller 130, in other examples, the technique may be performed by another system, alone or in combination with ACM 100.

In the example shown, ACM 100 may be initiated, started, and/or turned on (202). For example, a vehicle may be started and ACM 100 may start and/or initiate automatically, or an operator of the vehicle may separately turn on, start, or initiate ACM 100.

Controller 130 determines whether bleed air pressure at low pressure output port 102 is greater than a pressure demand (202). For example, ACM 100 may comprise one or more sensors, including pressure sensors, located at one or more positions along the flow of bleed air from low and high pressure bleed ports 102, 104 to an output port of turbine 124. The one or more sensors may be communicatively coupled to controller 130, and controller 130 may receive measurements and/or signals indicative of one or more fluid parameters at the one or more positions, e.g., bleed air pressure, bleed air flow volume, bleed air speed, bleed air temperature, moisture content and/or relative humidity, or the like. Based on the received measurement(s) and/or signal(s), controller 130 may then determine the bleed air pressure low pressure bleed port 102, high pressure bleed port 104, bleed port valve 106, the input of pressure relief shut off valve 110, input and output ports of compressor 120, the input and output ports of turbine 124, and at any other suitable position within ACM 100. Controller 130 may then determine whether the determined bleed air pressure will be enough to satisfy the demand by ACM 100 and any other system, e.g., anti-icing systems, nitrogen generation systems, or the like. For example, controller 130 causes and/or controls bleed port valve 106 to close (or remain closed) such that the bleed air is provided to ACM 100 via low pressure bleed port 102 rather than high pressure bleed port 104.

Controller 130 determines whether a pressure of the bleed air at the input port of turbine 124 is less than or equal to a threshold pressure (208). For example, other systems such as anti-icing systems and/or nitrogen generation systems may not be demanding bleed air (the YES branch from (204), and controller then next determines whether the bleed air is sufficient to drive turbine 124, which in turn drives compressor 120, and provide conditioned air, thermal control, and/or cabin pressurization to cabin 140. For example, the air conditioning and pressurization demands of cabin 140 may change, such that at times, the bleed air from low pressure bleed port 102 may be sufficient to drive turbine 124 to, in turn, drive compressor 120 to achieve a desired compression or compression ratio, and at other times the bleed air from low pressure bleed port 102 may not be sufficient. Controller 130 may determine whether motor-generator 126 may be operated in motor mode to assist with driving compressor 120, or in generator mode to collect excess energy from the bleed air driving turbine 124 and store the excess in electrical energy storage device 128.

In some examples, motor-generator 126 is configured to be always in operation, e.g., when ACM is operating, either in motor mode or generator mode. For example, controller 130 causes and/or controls motor-generator to be always in operation while ACM is operating (e.g., throughout all of the method described herein), either in motor mode or generator mode. For example, motor-generator 126 is not decoupled from shaft 132 based on bleed air pressure, bleed air demand, or the operational state of the vehicle, but rather is always either providing mechanical energy to shaft 132 (converted from electrical energy storage device 128) in motor mode or receiving mechanical energy from shaft 132 and converting the received mechanical energy to electrical energy and providing the converted electrical energy to electrical energy storage device 128 in generator mode.

In response to determining that the pressure at the input port of turbine 124 is less than or equal to the threshold pressure, controller 130 causes and/or controls motor-generator 126 operate in a motor mode (210), the YES branch from (208). For example, controller 130 may cause and/or control motor-generator 126 to provide mechanical energy to drive compressor 120, e.g., via converting electrical energy from electrical energy storage device 128 to mechanical energy delivered to compressor 120 via shaft 132. In some examples, motor-generator 126 assists turbine 124 in driving compressor 120 when motor-generator 126 is operating in motor mode.

In response to determining that the pressure at the input port of turbine 124 is greater than the threshold pressure, controller 130 causes and/or controls motor-generator 126 operate in a generator mode (212), the NO branch from (208). For example, controller 130 may cause and/or control motor-generator 126 to provide electrical energy to electrical energy storage device 128 via converting mechanical energy received from turbine 124 via shaft 132 to electrical energy when operating in generator mode. In some examples, only a portion of the mechanical energy that turbine 124 provides to drive shaft 132 is converted by motor-generator 126 to electrical energy, with the other portion driving compressor 120.

Controller 130 determines whether an operational state of the vehicle is a first operational state (214), the NO branch from (204). The first operational state may be a flight phase, e.g., one of taking off, climbing or cruising, or an operational state comprising an increased and/or relative high demand for thrust from the engine.

In response to determining that the operational state of the vehicle is the first operational state (a relatively "high" engine thrust demand), controller 130 causes and/or controls bleed port valve 106 to close (206), or remain closed, the YES branch from (214). For example, controller 130 causes and/or controls bleed port valve 106 to close such that the bleed air is provided to ACM 100, and the input port of turbine 124, via low pressure bleed port 102 rather than high pressure bleed port 104.

Controller 130 may then cause and/or control motor-generator to operate in motor mode (210). For example, controller 130 may determine and/or confirm that the pressure of the bleed air at the input port of turbine is less than the threshold pressure, e.g., via one or more sensors or at least by virtue of the demand for bleed air being high and the bleed air pressure at low pressure bleed port 102 being less than the pressure demand, e.g., following the NO branch at (204). In this way, ACM 100 may improve the efficiency of the engine by utilizing bleed air from low pressure bleed port 102 rather than the high pressure bleed port 104 during high thrust demand flight phases and high bleed air demands by vehicle systems, even though the bleed air from low pressure bleed port 102 may not be sufficient to provide the desired conditioned air, thermal control, and pressurization of cabin 140, by assisting and/or boosting driving compressor 120 such that ACM 100 may still provide the conditioned air, thermal control, and pressurization of cabin 140. In some examples, other vehicle systems that demand bleed air may utilize bleed air from the compression stage of the engine corresponding to high pressure bleed port 104, however, ACM 100 reduces the overall bleed air demand from the higher compression stage by utilizing bleed air from the relatively lower compression stage of the engine and assisting driving compressor 120 by motor-generator 126 operating in motor mode.

In response to determining that the operational state of the vehicle is not the first operational state, e.g., is a second operational state or a relatively "low" engine demand operational state, controller 130 causes and/or controls bleed port valve 106 to open (218), the NO branch from (214). For example, controller 130 causes and/or controls bleed port valve 106 to open such that the bleed air is provided to ACM 100, and the input port of turbine 124, via high pressure bleed port 104. In some examples, the second operational state comprises at least one of landing or descending Controller 130 may then cause and/or control motor-generator to operate in generator mode (212). For example, controller 130 may determine and/or confirm that the pressure of the bleed air at the input port of turbine is greater than or equal to the threshold pressure, e.g., at least by virtue of the bleed air being provided by high pressure bleed port 104 and/or one or more sensors.

Figure 3:
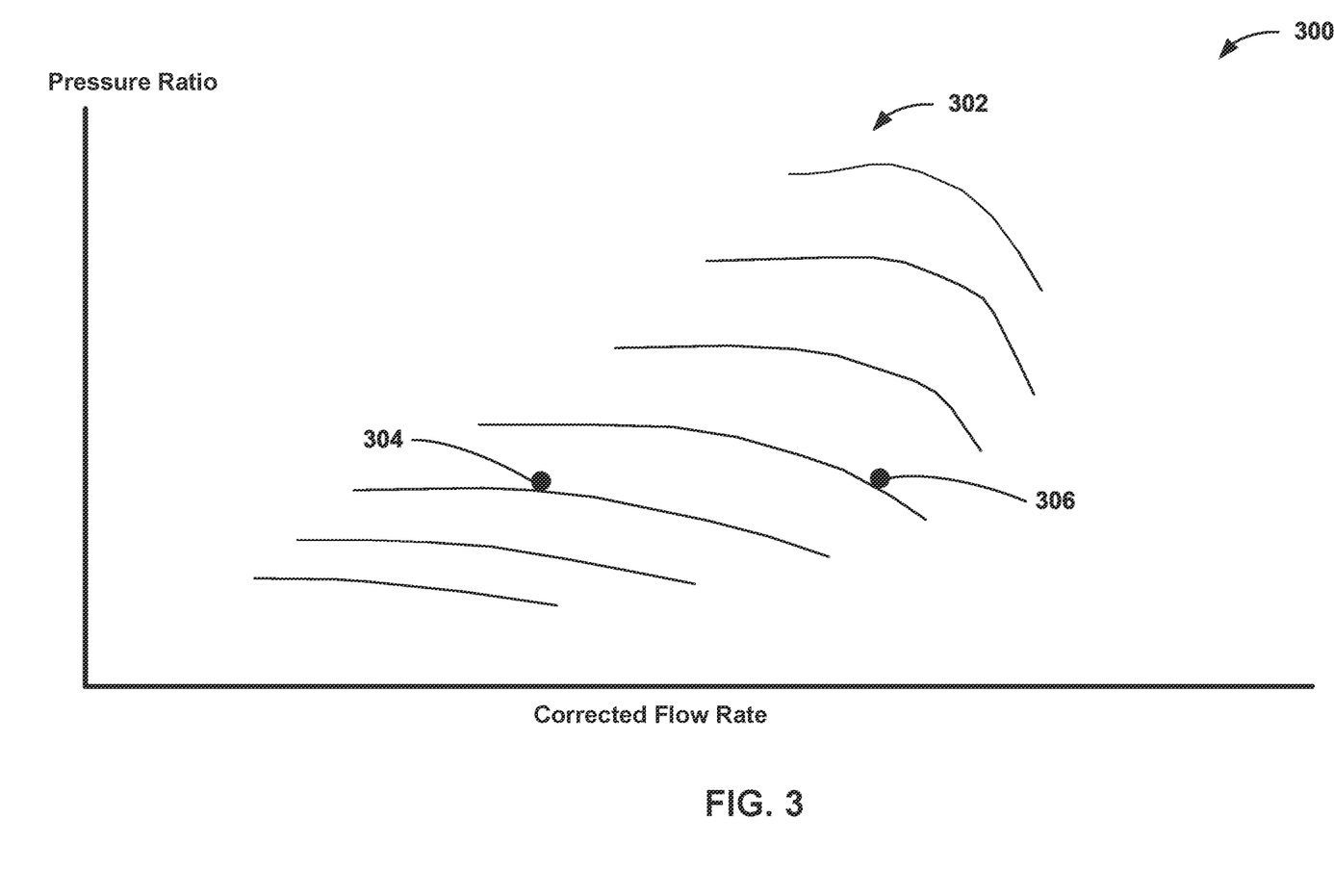
FIG. 3 is a plot of example pressure ratios versus flow rates, in accordance with one or more techniques of this disclosure.

FIG. 3 is a plot 300 of example pressure ratios versus flow rates, in accordance with one or more techniques of this disclosure. In the example shown, plot lines 302 illustrate a compressor map of one or more compressors 120, which may be a turbocharger. Plot lines 302 illustrate driving compressor 120 at different amounts to provide a larger or smaller pressure ratio, to provide an increased or decreased rate of air flow. Pneumatic operating condition 304 illustrates a particular flow rate for a particular pressure ratio achieved by turbine 124 operating without assist from motor-generator 126 to drive compressor 120. Electric operating condition 306 illustrates a particular flow rate, e.g., and increased flow rate relative to pneumatic operating condition 304, for a particular pressure ratio, e.g., a substantially same pressure ratio as pneumatic operating condition 304, achieved by turbine 124 operating with assist from motor-generator 126 to drive compressor 120. Plot 300 illustrates that ACM 100 may draw more airflow without increasing a pressure ratio via motor-generator operating in motor mode, e.g., ACM 100 may provide an amount of conditioned air, thermal control, and pressurization of cabin 140 at lower bleed air pressures.

In one or more examples, the functions described in this disclosure, e.g., with respect to controller 130 or any of the systems described herein, may be implemented in hardware, software, firmware, or any combination thereof. If implemented in software, the functions may be stored on, as one or more instructions or code, a computer-readable medium and executed by a hardware-based processing unit. The computer-readable medium may be an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, PROM, EPROM, EEPROM, FRAM, flash memory, a hard disk, a CD-ROM, a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

The functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements.

The present disclosure includes the following non-limiting examples.

Example 1: A system including: a turbine comprising an input port and mechanically coupled to a motor-generator and a compressor; and control circuitry configured to: determine whether a pressure of a fluid at the input port of the turbine is less than or equal to than a threshold pressure; and in response to determining that the pressure of the fluid at the input port of the turbine is less than or equal to the threshold pressure, cause the motor-generator to operate in motor mode, wherein the motor-generator is configured to be mechanically coupled to the compressor, wherein the motor-generator is configured to provide mechanical energy to drive the compressor when operating in motor mode.

Example 2: The system of example 1, wherein the control circuitry is further configured to: in response to determining that the pressure at the input port of the turbine is greater than the threshold pressure, cause the motor-generator to operate in generator mode, wherein the motor-generator is electrically coupled to an electrical energy storage device, wherein the motor-generator is configured to provide electrical energy to the electrical energy storage device when operating in generator mode.

Example 3: The system of example 1 or example 2, wherein the turbine is configured to provide mechanical energy to drive the compressor, wherein the motor-generator is configured to provide mechanical energy to the compressor to assist the turbine in driving the compressor when the motor-generator is operating in motor mode.

Example 4: The system of any one of examples 1 through 3, wherein the turbine is configured to be driven by the pressure of the fluid at the input port via a drop in pressure over the turbine between the input port and an output port of the turbine, wherein the fluid is cooled via the drop in pressure and is provided to a cabin of a vehicle via the output port of the turbine.

Example 5: The system of any one of examples 1 through 4, wherein an output port of the compressor is fluidically coupled to the input port of the turbine.

Example 6: The system of any one of examples 1 through 5, wherein the input port of the turbine is fluidically coupled to a low pressure bleed port of an engine, wherein the input port of the turbine is fluidically coupled to a high pressure bleed port of the engine via a bleed port valve.

Example 7: The system of example 6, wherein the control circuitry is further configured to: determine an operational state of a vehicle; and in response to determining that the operational state of the vehicle is a first operational state, cause the bleed port valve to close to provide the fluid to the input port of the turbine via the low pressure bleed port.

Example 8: The system of example 7, wherein the control circuitry is further configured to: in response to determining that the operational state of the vehicle is a second operational state, cause: the bleed port valve to open to provide the fluid to the input port of the turbine via the high pressure bleed port; and the motor-generator to operate in generator mode, wherein the motor-generator is electrically coupled to an electrical energy storage device, wherein the motor-generator is configured to provide electrical energy to the electrical energy storage device when operating in generator mode.

Example 9: The system of example 8, wherein the vehicle is an aircraft, where the first operational state comprises at least one of taking off, climbing or cruising, wherein the second operational state comprises at least one of landing or descending.

Example 10: The system of any one of examples 1 through 9, further comprising an air conditioning system comprising the turbine, the motor-generator, the compressor, and a heat exchanger fluidically coupled to an output port of the compressor and fluidically coupled to the input port of the turbine, wherein the fluid is air, wherein the air conditioning system provides cooled air to a cabin of an aircraft.

Example 11: A method including: determining, by control circuitry, whether a pressure of a fluid at an input port of a turbine is less than or equal to a threshold pressure; and in response to determining that the pressure at the input port of the turbine is less than or equal to the threshold pressure, causing, by the control circuitry, a motor-generator mechanically coupled to the turbine to operate in a motor mode, wherein the motor-generator and the turbine are mechanically coupled to a compressor, wherein the motor-generator provides mechanical energy to drive the compressor when operating in motor mode.

Example 12: The method of example 11, further including: in response to determining that the pressure at the input port of the turbine is greater than the threshold pressure, causing, by the control circuitry, a motor-generator mechanically coupled to the turbine to operate in generator mode, wherein the motor-generator is electrically coupled to an electrical energy storage device, wherein the motor-generator provides electrical energy to the electrical energy storage device when operating in generator mode.

Example 13: The method of example 11 or example 12, further including providing, by the turbine, mechanical energy to drive the compressor, wherein the motor-generator assists the turbine in driving the compressor when the motor-generator is operating in motor mode.

Example 14: The method of any one of examples 11 through 13, wherein the pressure of the fluid at the input port of the turbine provides mechanical energy to drive the turbine via a drop in pressure, wherein the fluid is cooled via the drop in pressure and is provided to a cabin of a vehicle.

Example 15: The method of any one of examples 11 through 14, further including providing the fluid from an output port of the compressor to the input port of the turbine fluidically coupled to the output port of the compressor.

Example 16: The method of any one of examples 11 through 15, further including: providing the fluid to the input port of the turbine from at least one of a low pressure bleed port of an engine that is fluidically coupled to a input port of the turbine or a high pressure bleed port of the engine that is fluidically coupled to a bleed port valve that is fluidically coupled to the input port of the turbine; determining an operational state of a vehicle; and in response to determining that the operational state of the vehicle is a first operational state, causing, by the control circuitry, the bleed port valve to close to provide the fluid to the input port of the turbine via the low pressure bleed port.

Example 17: The method of example 16, further including: in response to determining that the operational state of the vehicle is a second operational state, causing, by the control circuitry: the bleed port valve to open to provide the fluid to the input port of the turbine via the high pressure bleed port; and the motor-generator to operate in a generator mode, wherein the motor-generator is electrically coupled to an electrical energy storage device, wherein the motor-generator provides electrical energy to the electrical energy storage device when operating in generator mode, wherein the vehicle is an aircraft, where the first operational state comprises at least one of taking off, climbing or cruising, wherein the second operational state comprises at least one of landing, or descending.

Example 18: The method of any one of examples 11 through 17, wherein an air conditioning system comprises the turbine, the motor-generator, the compressor, and a heat exchanger fluidically coupled to an output port of the compressor and fluidically coupled to the input port of the turbine, wherein the fluid is air, wherein the air conditioning system provides cooled air to a cabin of an aircraft.

Example 19: A non-transitory computer readable medium comprising instructions that when executed cause one or more processors to: determine whether a pressure of a fluid at an input port of a turbine is less than or equal to than a threshold pressure; and in response to determining that the pressure at the input port of the turbine is less than or equal to the threshold pressure, cause a motor-generator mechanically coupled to the turbine to operate in motor mode, wherein the motor-generator and the turbine are mechanically coupled to a compressor, wherein the motor-generator provides mechanical energy to drive the compressor when operating in motor mode.

Example 20: The non-transitory computer readable medium of example 19, wherein the input port of the turbine is fluidically coupled to a low pressure bleed port of an engine, wherein the input port of the turbine is fluidically coupled to a high pressure bleed port of the engine via a bleed port valve, non-transitory computer readable medium further comprises instructions that when executed cause the one or more processors to: determine an operational state of a vehicle; in response to determining that the operational state of the vehicle is a first operational state, cause the bleed port valve to close to provide the fluid to the input port of the turbine via the low pressure bleed port; and in response to determining that the operational state of the vehicle is a second operational state, cause: the bleed port valve to open to provide the fluid to the input port of the turbine via the high pressure bleed port; and the motor-generator to operate in generator mode, wherein the motor-generator is electrically coupled to an electrical energy storage device, wherein the motor-generator provides electrical energy to the electrical energy storage device when operating in generator mode, wherein the vehicle is an aircraft, where the first operational state comprises at least one of taking off, climbing or cruising, wherein the second operational state comprises at least one of landing or descending.

Various examples have been described. These and other examples are within the scope of the following claims.

What is claimed is:

1. A system comprising:
   a turbine comprising an input port and mechanically coupled to a motor-generator and a compressor, wherein the input port of the turbine is fluidically coupled to a low pressure bleed port of an engine, wherein the input port of the turbine is fluidically coupled to a high pressure bleed port of the engine via a bleed port valve; and
   control circuitry configured to:
      determine whether a pressure of a fluid at the input port of the turbine is less than or equal to than a threshold pressure;
      in response to determining that the pressure of the fluid at the input port of the turbine is less than or equal to the threshold pressure, determine an operational state of a vehicle; and
      in response to determining that the operational state of the vehicle is a first operational state, cause the bleed port valve to close to provide the fluid to the input port of the turbine via the low pressure bleed port and cause the motor-generator to operate in motor mode,
   wherein the motor-generator is configured to be mechanically coupled to the compressor,
   wherein the motor-generator is configured to provide mechanical energy to drive the compressor when operating in motor mode,
   wherein the vehicle is an aircraft, and the first operational state comprises one of taking off, climbing, or cruising.

2. The system of claim 1, wherein the control circuitry is further configured to:
   in response to determining that the pressure at the input port of the turbine is greater than the threshold pressure, cause the motor-generator to operate in generator mode, wherein the motor-generator is electrically coupled to an electrical energy storage device, wherein the motor-generator is configured to provide electrical energy to the electrical energy storage device when operating in generator mode.

3. The system of claim 1, wherein the turbine is configured to provide mechanical energy to drive the compressor, wherein the motor-generator is configured to provide mechanical energy to the compressor to assist the turbine in driving the compressor when the motor-generator is operating in motor mode.

4. The system of claim 1, wherein the turbine is configured to be driven by the pressure of the fluid at the input port via a drop in pressure over the turbine between the input port and an output port of the turbine, wherein the fluid is cooled via the drop in pressure and is provided to a cabin of the vehicle via the output port of the turbine.

5. The system of claim 1, wherein an output port of the compressor is fluidically coupled to the input port of the turbine.

6. The system of claim 1, wherein the control circuitry is further configured to:
in response to determining that the operational state of the vehicle is a second operational state, cause:
the bleed port valve to open to provide the fluid to the input port of the turbine via the high pressure bleed port; and
the motor-generator to operate in generator mode, wherein the motor-generator is electrically coupled to an electrical energy storage device, wherein the motor-generator is configured to provide electrical energy to the electrical energy storage device when operating in generator mode.

7. The system of claim 6, wherein the second operational state comprises at least one of landing or descending.

8. The system of claim 1, further comprising an air conditioning system comprising the turbine, the motor-generator, the compressor, and a heat exchanger fluidically coupled to an output port of the compressor and fluidically coupled to the input port of the turbine, wherein the fluid is air, wherein the air conditioning system provides cooled air to a cabin of the aircraft.

9. A method comprising:
determining, by control circuitry, whether a pressure of a fluid at an input port of a turbine is less than or equal to a threshold pressure, wherein the input port of the turbine is fluidically coupled to a low pressure bleed port of an engine, wherein the input port of the turbine is fluidically coupled to a high pressure bleed port of the engine via a bleed port valve;
in response to determining that the pressure at the input port of the turbine is less than or equal to the threshold pressure, determining an operational state of a vehicle; and
in response to determining that the operational state of the vehicle is a first operational state, causing, by the control circuitry, the bleed port valve to close to provide the fluid to the input port of the turbine via the low pressure bleed port and a motor-generator mechanically coupled to the turbine to operate in a motor mode,
wherein the vehicle is an aircraft, and the first operational state comprises one of taking off, climbing, or cruising, and
wherein the motor-generator and the turbine are mechanically coupled to a compressor, wherein the motor-generator provides mechanical energy to drive the compressor when operating in motor mode.

10. The method of claim 9, further comprising:
in response to determining that the pressure at the input port of the turbine is greater than the threshold pressure, causing, by the control circuitry, the motor-generator mechanically coupled to the turbine to operate in generator mode,
wherein the motor-generator is electrically coupled to an electrical energy storage device, wherein the motor-generator provides electrical energy to the electrical energy storage device when operating in generator mode.

11. The method of claim 9, further comprising providing, by the turbine, mechanical energy to drive the compressor, wherein the motor-generator assists the turbine in driving the compressor when the motor-generator is operating in motor mode.

12. The method of claim 9, wherein the pressure of the fluid at the input port of the turbine provides mechanical energy to drive the turbine via a drop in pressure, wherein the fluid is cooled via the drop in pressure and is provided to a cabin of the vehicle.

13. The method of claim 9, further comprising providing the fluid from an output port of the compressor to the input port of the turbine fluidically coupled to the output port of the compressor.

14. The method of claim 9, further comprising:
providing the fluid to the input port of the turbine from at least one of the low pressure bleed port of the engine that is fluidically coupled to the input port of the turbine or the high pressure bleed port of the engine that is fluidically coupled to the bleed port valve that is fluidically coupled to the input port of the turbine.

15. The method of claim 14, further comprising:
in response to determining that the operational state of the vehicle is a second operational state, causing, by the control circuitry:
the bleed port valve to open to provide the fluid to the input port of the turbine via the high pressure bleed port; and
the motor-generator to operate in a generator mode, wherein the motor-generator is electrically coupled to an electrical energy storage device, wherein the motor-generator provides electrical energy to the electrical energy storage device when operating in generator mode,
wherein the second operational state comprises at least one of landing, or descending.

16. The method of claim 9, wherein an air conditioning system comprises the turbine, the motor-generator, the compressor, and a heat exchanger fluidically coupled to an output port of the compressor and fluidically coupled to the input port of the turbine, wherein the fluid is air, wherein the air conditioning system provides cooled air to a cabin of the aircraft.

17. A non-transitory computer readable medium comprising instructions that when executed cause one or more processors to:
determine whether a pressure of a fluid at an input port of a turbine is less than or equal to a threshold pressure, wherein the input port of the turbine is fluidically coupled to a low pressure bleed port of an engine, wherein the input port of the turbine is fluidically coupled to a high pressure bleed port of the engine via a bleed port valve; and
in response to determining that the pressure at the input port of the turbine is less than or equal to the threshold pressure, determine an operational state of a vehicle; and
in response to determining that the operational state of the vehicle is a first operational state, cause the bleed port valve to close to provide the fluid to the input port of the turbine via the low pressure bleed port and cause a motor-generator mechanically coupled to the turbine to operate in motor mode,
wherein the vehicle is an aircraft, and the first operational state comprises at least one of taking off, climbing, or cruising, and
wherein the motor-generator and the turbine are mechanically coupled to a compressor, wherein the motor-generator provides mechanical energy to drive the compressor when operating in motor mode.

18. The non-transitory computer readable medium of claim 17, the non-transitory computer readable medium further comprising instructions that when executed cause the one or more processors to:
  in response to determining that the operational state of the vehicle is a second operational state, cause:
    the bleed port valve to open to provide the fluid to the input port of the turbine via the high pressure bleed port; and
    the motor-generator to operate in generator mode, wherein the motor-generator is electrically coupled to an electrical energy storage device, wherein the motor-generator provides electrical energy to the electrical energy storage device when operating in generator mode,
  wherein the second operational state comprises at least one of landing or descending.

\* \* \* \* \*